M. GOHLKE.
THRUST BEARING.
APPLICATION FILED SEPT. 30, 1913.
1,176,889.
Patented Mar. 28, 1916.
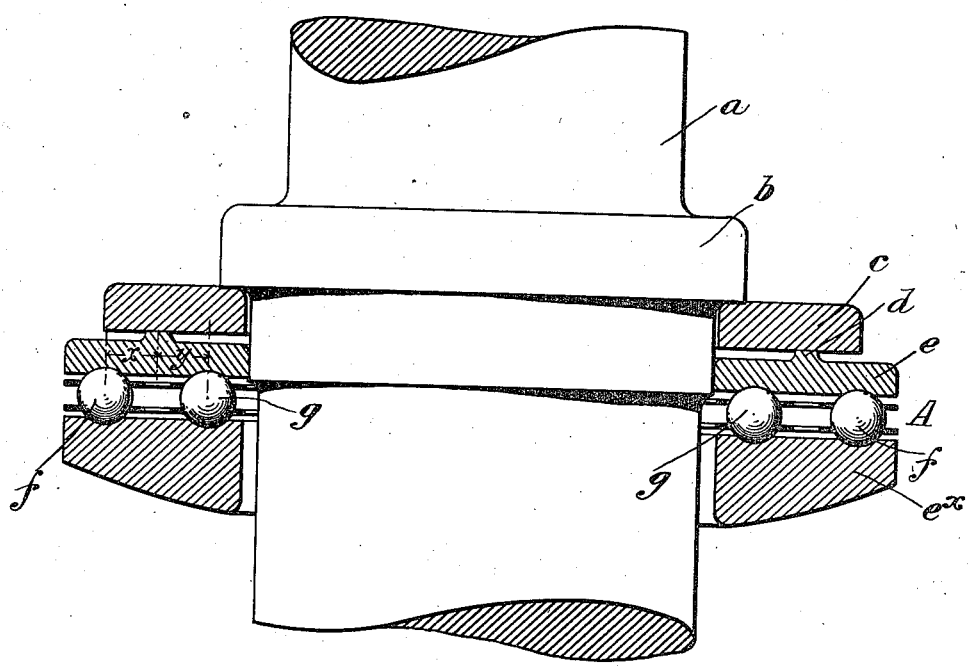
Attest:
Inventor:
by Max Gohlke
Rogers, Kennedy Campbell Attys.

UNITED STATES PATENT OFFICE.

MAX GOHLKE, OF BERLIN, GERMANY.

THRUST-BEARING.

1,176,889.

Specification of Letters Patent.  Patented Mar. 28, 1916.

Application filed September 30, 1913. Serial No. 792,661.

*To all whom it may concern:*

Be it known that I, MAX GOHLKE, a subject of the Emperor of Germany, residing at Berlin, Germany, have invented certain new and useful Improvements in Thrust-Bearings, of which the following is a specification, reference being had therein to the accompanying drawing.

This invention relates to thrust or step bearings, in which an antifriction bearing is arranged to receive the thrust loads to which the rotary member or shaft are subjected.

Thrust bearings of this type have heretofore been provided with a plurality of individual antifriction bearings, consisting each of opposite casing members and intermediate rolling elements, with which pressure distributing devices have been so combined as to divide or distribute the thrusts of the shaft between the bearings proportionately to their load bearing capacity. For certain purposes these constructions are expensive by reason of their complicated nature, and it is the aim of this invention to provide for the distribution of the loads among a plurality of series of rolling elements, without the employment of individual casing members for the respective series, and the invention consists in transmitting the loads of the shaft or rotary member to the plurality of series of rolling elements, through the medium of a common casing member, so constructed that by its inherent elasticity or capability of temporary deformation, the total load or pressure of the rotary member received by said casing member, will be distributed among the rolling elements in proportion to the bearing capacity of the respective series.

The drawing is a sectional elevation of a shaft and bearing having my invention embodied therein.

Referring to the drawings: $a$ represents a shaft provided with an annular projecting shoulder $b$. Surrounding the shaft, in position to support the thrusts and loads thereof, is an antifriction bearing A, comprising opposing casing members $e$ and $e^x$, and two concentric series of rolling elements $f$ and $g$, in the form of balls, traveling in opposing ball tracks in the adjacent faces of the casing members. The casing member $e$, is arranged adjacent the shoulder $b$, and it is provided on its outer side with an annular bearing projection in the form of a rib $d$, against which bears a pressure ring $c$, loosely surrounding the shaft and engaged near its inner edge by the shoulder $b$, on the shaft. The casing member $e$, is of such material, and so formed, that it will possess some degree of elasticity, and the pressure loads of the shaft being received by the annular bearing rib on the casing member, will be distributed among the two series of balls proportionately to the intervals between the rib and ball centers, the shorter the interval between the rib and centers of one series of balls, the greater the load imposed on that series, and the less the load on the other series, and vice versa. The location of the bearing rib relatively to the ball centers is determined by the load bearing capacity of the series, so that by the predeterminate location of the bearing rib relatively to the two series of balls, the load received by the casing member may be distributed among the balls in a known and predeterminate manner proportionately to their load bearing capacity. The pressure ring C, will also possess some degree of inherent elasticity, which coming into play in connection with the elastic action of the casing member $e$, the total pressure or load of the shaft will be distributed between the two series of rolling elements in an effective manner and in proper proportion.

The construction described is simple in form and effective in operation, in accomplishing the results heretofore attained only by complicated and expensive structures, and while the form of invention shown and described has been found in practice to answer to a satisfactory degree the ends to be attained, it will be understood that the same is susceptible of various modifications and changes without departing from the limits of the invention, and it will be further understood that the invention is not limited to any particular form or construction of the parts except in so far as such limitations are specified in the claims.

Having thus described my invention what I claim is:

1. In combination with a rotary member, a thrust bearing comprising a plurality of series of rolling elements, a one-piece elastic casing member independent of the rotary member and bearing directly on and common to all of said series of rolling elements, and an opposed casing member also independent of the rotary member, the first mentioned casing member being formed with a fixed projection in position to receive the thrust loads of the rotary member, and said projection being so located relatively to the series of rolling elements that the thrust loads will by the elasticity of the casing member be distributed among the series of rolling elements in predetermined degree.

2. In combination with a rotary member, a thrust bearing comprising two series of rolling elements, a one-piece elastic casing member common to and bearing directly on both of said series of rolling elements, an opposing casing member, the first mentioned casing member being provided with a fixed annular bearing projection, and a pressure ring loosely encircling said rotary member in position to receive at its inner edge the thrust loads of the same, and bearing at a point beyond its edge against said annular bearing projection.

In testimony whereof I have affixed my signature in presence of two witnesses.

MAX GOHLKE.

Witnesses:
 WOLDEMAR HAUPT,
 HENRY HASPER.